United States Patent
Filer

(10) Patent No.: US 6,531,168 B1
(45) Date of Patent: Mar. 11, 2003

(54) FILTER SYSTEM

(76) Inventor: Kelvin D. Filer, 363 W. Compton Blvd., Compton, CA (US) 90220

(*) Notice: Subject to any disclaimer, the term of this patent is extended or adjusted under 35 U.S.C. 154(b) by 0 days.

(21) Appl. No.: 09/920,202

(22) Filed: Aug. 1, 2001

Related U.S. Application Data

(63) Continuation-in-part of application No. 09/243,736, filed on Feb. 1, 1999, now abandoned.

(51) Int. Cl.[7] .............................. A23L 1/22; A23F 5/24
(52) U.S. Cl. ......................... 426/77; 426/78; 426/132; 426/433
(58) Field of Search .................... 426/77, 78, 79, 426/84, 80, 81, 82, 83, 132, 433

(56) References Cited

U.S. PATENT DOCUMENTS

| | | |
|---|---|---|
| 3,006,764 A | 10/1961 | Stephenson et al. |
| 3,126,284 A | 3/1964 | Howerin |
| 3,689,291 A | 9/1972 | Draper |
| 4,076,847 A | 2/1978 | Johnson et al. |
| 4,612,942 A | 9/1986 | Dobberstein et al. |
| 4,826,695 A | 5/1989 | Tanner |
| 4,891,232 A | 1/1990 | Dahl |
| 4,975,292 A | 12/1990 | Loizzi |
| 5,043,172 A | 8/1991 | Loizzi |
| 5,147,540 A | 9/1992 | Hagan |
| D343,271 S | 1/1994 | Kenney |
| 5,298,267 A | 3/1994 | Gruenbacher |
| 5,518,743 A | 5/1996 | Pergola et al. |
| 5,656,315 A | 8/1997 | Tucker et al. |
| 5,885,633 A | 3/1999 | Lehrer |
| 5,932,260 A | 8/1999 | Soughan |

FOREIGN PATENT DOCUMENTS

| | | |
|---|---|---|
| GB | 888351 | 1/1962 |
| WO | WO93/01105 | 1/1993 |

OTHER PUBLICATIONS

Prepared Foods, p. 104, Jun. 1982.*
Product Alert, v. 26, No. 5, Mar. 11, 1996.*
Product Alert, v. 26, No. 17, Sep. 9, 1996.*
Chemical Abstracts 107: Goyst. Hung. Telse. Sep. 1986 HU 39, 343.
Dialog Abstract, Product Alert v.26, n.8 Apr. 1996.

* cited by examiner

*Primary Examiner*—Steve Weinstein

(57) ABSTRACT

A filter system including a filter element with an upper portion with downwardly tapering side walls having a top for the receipt of a primary flavor material to be brewed and water to be poured there over for brewing purposes. Also included is a closed lower portion coupled at its periphery to the lower extent of the upper portion adapted to support ground flavor material thereon for being brewed and to allow the passage of water from above the flavor material to beneath and through the lower portion. The filter of the system is fabricated of paper in a one-piece configuration with flavor crystals dispersed throughout the entire paper of the filter for disseminating a flavor other than that of the primary flavor material.

7 Claims, 3 Drawing Sheets

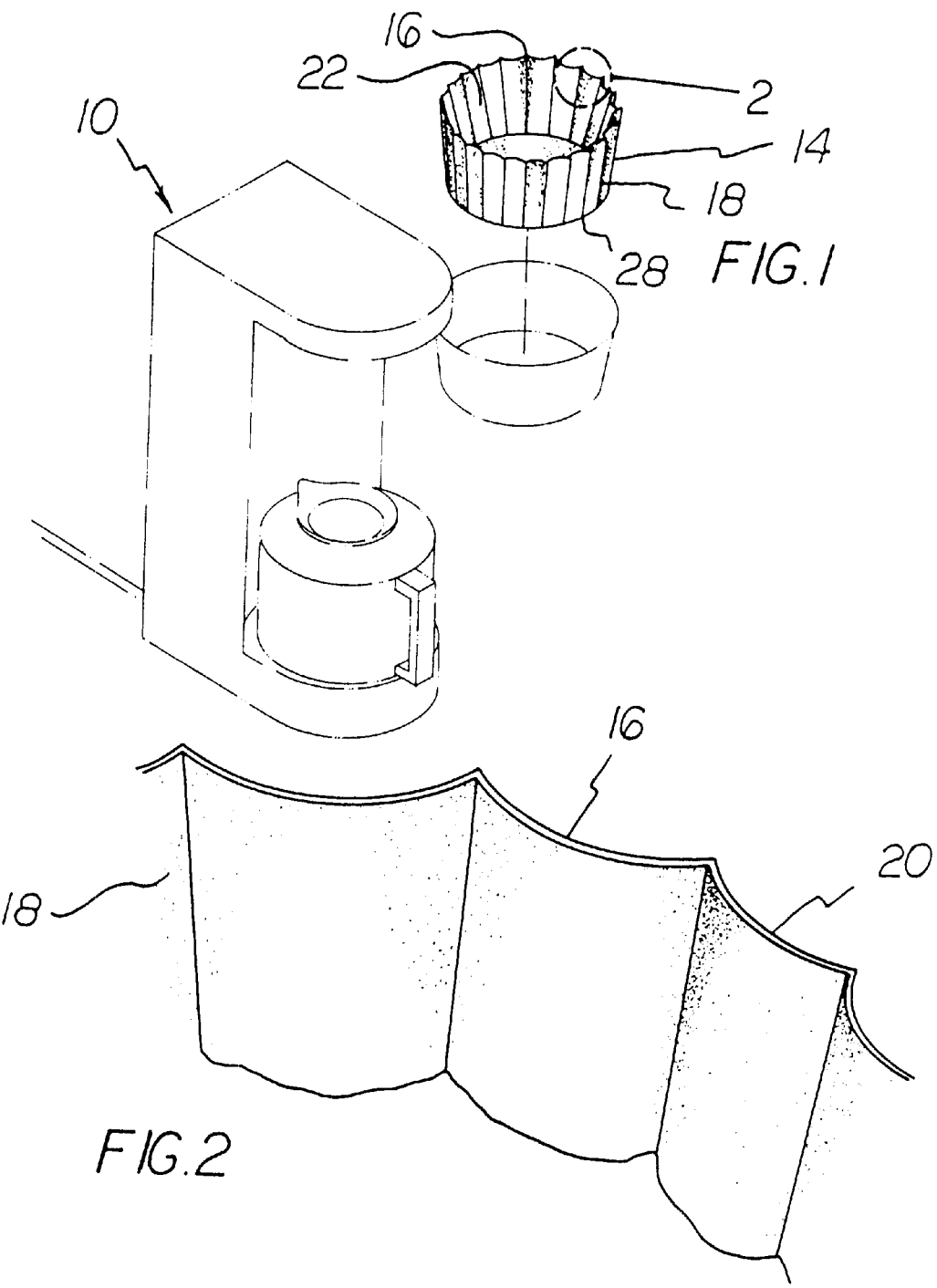

FILTER SYSTEM

RELATED APPLICATION

This application is a continuation-in-part of application Ser. No. 09/243,736 filed Feb. 1, 1999, now abandoned, entitled Filter System the subject matter of which is incorporated herein by reference.

BACKGROUND OF THE INVENTION

1. Field of the Invention

The present invention relates to a filter system and more particularly pertains to blending flavoring with coffee flavor during the brewing of coffee.

2. Description of the Prior Art

The use of filters of known designs and configurations is known in the prior art. More specifically, filters of known designs and configurations previously devised and utilized for the purpose of brewing coffee through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 343,271 to Kenney discloses an Infusion Package. U.S. Pat. No. 5,043,172 to Loizzi discloses flavored inserts for coffee filters. U.S. Pat. No. 5,298,267 to Gruenbacher discloses a coffee filter pack. U.S. Pat. No. 4,975,292 to Loizzi discloses flavored inserts for coffee filters or the like. U.S. Pat. No. 5,518,743 to Pergola et al discloses a method of impregnating a paper filter with a flavoring agent. Lastly, International Patent Application Number PCT/US92/05624 assigned to The Proctor & Gamble Company discloses a coffee filter pack.

While these devices fulfill their respective, particular objectives and requirements, the aforementioned patents do not describe a filter system that allows blending flavoring with coffee flavor during the brewing of coffee.

In this respect, the filter system according to the present invention substantially departs from the conventional concepts and designs of the prior art, and in doing so provides an apparatus primarily developed for the purpose of blending flavoring with coffee flavor during the brewing of coffee.

Therefore, it can be appreciated that there exists a continuing need for a new and improved filter system which can be used for blending flavoring with coffee flavor during the brewing of coffee. In this regard, the present invention substantially fulfills this need.

SUMMARY OF THE INVENTION

In view of the foregoing disadvantages inherent in the known types of filters of known designs and configurations now present in the prior art, the present invention provides an improved filter system. As such, the general purpose of the present invention, which will be described subsequently in greater detail, is to provide a new and improved filter system and method which has all the advantages of the prior art and none of the disadvantages.

To attain this, the present invention essentially comprises a new and improved filter system for blending flavoring with coffee flavor during the brewing of coffee. The system comprises in combination a filter element having an upper portion with downwardly tapering side walls and vertical undulations having an open top for the receipt of coffee to be brewed and water to be poured there over for brewing purposes. Further included in the system is a closed lower portion coupled at its periphery to the lower extent of the upper portion adapted to support ground coffee thereon for being brewed and to allow the passage of water from above the coffee to beneath and through the lower portion. The filter of the system is fabricated of paper in a one-piece configuration with flavor crystals dispersed throughout the entire paper of the filter for disseminating a flavor other than coffee to the coffee being brewed, the paper of the filter also including a dye to color the paper coordinated to the flavor of the particles within the filter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filter system which has all of the advantages of the prior art filters of known designs and configurations and none of the disadvantages.

It is another object of the present invention to provide a new and improved filter system which may be easily and efficiently manufactured and marketed.

It is further object of the present invention to provide a new and improved filter system which is of durable and reliable constructions.

An even further object of the present invention is to provide a new and improved filter system which is susceptible of a low cost of manufacture with regard to both materials and labor, and which accordingly is then susceptible of low prices of sale to the consuming public, thereby making such filter system economically available to the buying public.

Even still another object of the present invention is to provide a filter system for blending flavoring with coffee flavor during the brewing of coffee.

Lastly, it is an object of the present invention to provide a new and improved filter system including a filter element with an upper portion with downwardly tapering side walls having a top for the receipt of a primary flavor material to be brewed and water to be poured there over for brewing purposes. Also included is a closed lower portion coupled at its periphery to the lower extent of the upper portion adapted to support ground flavor material thereon for being brewed and to allow the passage of water from above the flavor material to beneath and through the lower portion. The filter of the system is fabricated of paper in a one-piece configuration with flavor crystals dispersed throughout the entire paper of the filter for disseminating a flavor other than that of the primary flavor material being brewed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the filter system constructed in accordance with the principles of the present invention.

FIG. 2 is an enlarged perspective view taken at circle 2 of FIG. 1.

The same reference numerals refer to the same parts throughout the various Figures.

DESCRIPTION OF THE PREFERRED EMBODIMENT

Figure 3:
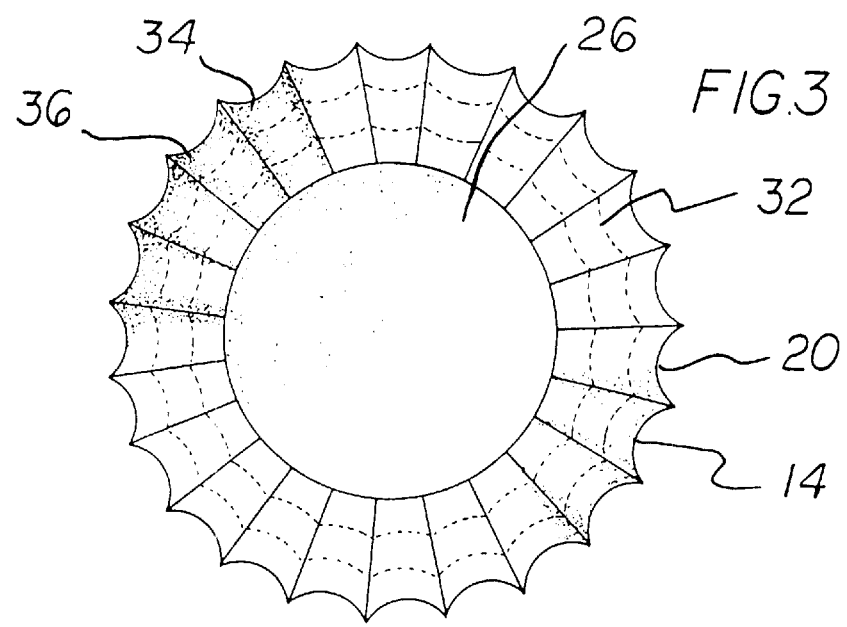
FIG. 3 is a top elevational view of the filter shown in FIGS. 1 and 2.

With reference now to the drawings, and in particular to FIG. 1 thereof, the preferred embodiment of the new and improved filter system embodying the principles and concepts of the present invention and generally designated by the reference numeral 10 will be described.

The present invention, the filter system 10 is comprised of a plurality of components. Such components in their broadest context include a filter element, an upper portion and a lower portion. Each of the individual components is configured and correlated one with respect to the other so as to attain the desired objectives. Such components are individually configured and correlated with respect to each other so as to attain the desired objectives.

The system as set forth herein is a new and improved filter system 10 for blending flavoring with coffee flavor during the brewing of coffee. The system comprises in combination a filter element 14 having an upper portion 16 with downwardly tapering side walls 18 and vertical undulations 20 having an open top 22 for the receipt of coffee to be brewed and water to be poured there over for brewing purposes.

Further included in the system is a closed lower portion 26 coupled at its periphery to the lower extent 28 of the upper portion adapted to support ground coffee thereon for being brewed and to allow the passage of water from above the coffee to beneath and through the lower portion.

The filter of the system is fabricated of paper in a one-piece configuration with strands 32 and also flavor particles 34 of crystal dispersed throughout the entire paper of the filter for disseminating a flavor other than coffee to the coffee being brewed. The paper of the filter may also include a dye 36 coating the strands to color the paper coordinated to the flavor of the particles within the filter.

Figure 4:
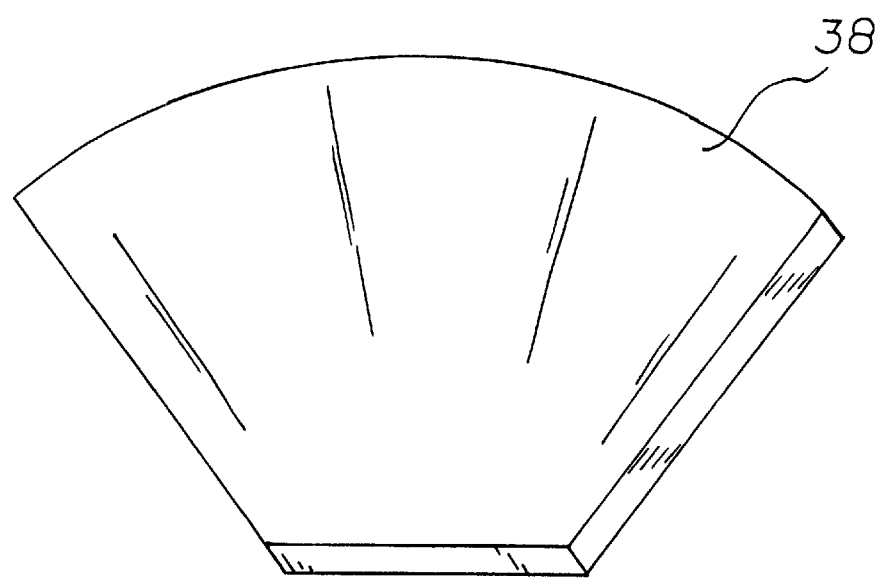
FIG. 4 is a perspective view of a cone constituting an alternate embodiment of the invention.

The primary embodiment is shown in FIGS. 1 through 3 as having a filter with a flat circular bottom and upstanding side walls. In an alternate embodiment, the filter is capable of being formed in a generally cone-shaped configuration but with a linear bottom edge as is conventional in the art including the patent literature. A further alternate embodiment is shown in FIG. 4. In such Figure, the filter 38 is shown in a cone-shaped configuration. Such cone-shaped filter is adapted for receiving ground coffee or, in the alternative, ground tea to be brewed as the preferred primary flavor generating material.

The filter systems of the present invention are similar to regular disposable paper filters. Flavoring, however, is added to the paper filter so that when coffee is brewed, the action of the water passing through the filter will blend the flavoring into the brewed pot of coffee. For example, this is preferably accomplished with malleable strands of flavoring which are interwoven through an existing paper filter at the time of manufacture.

Figure 5:
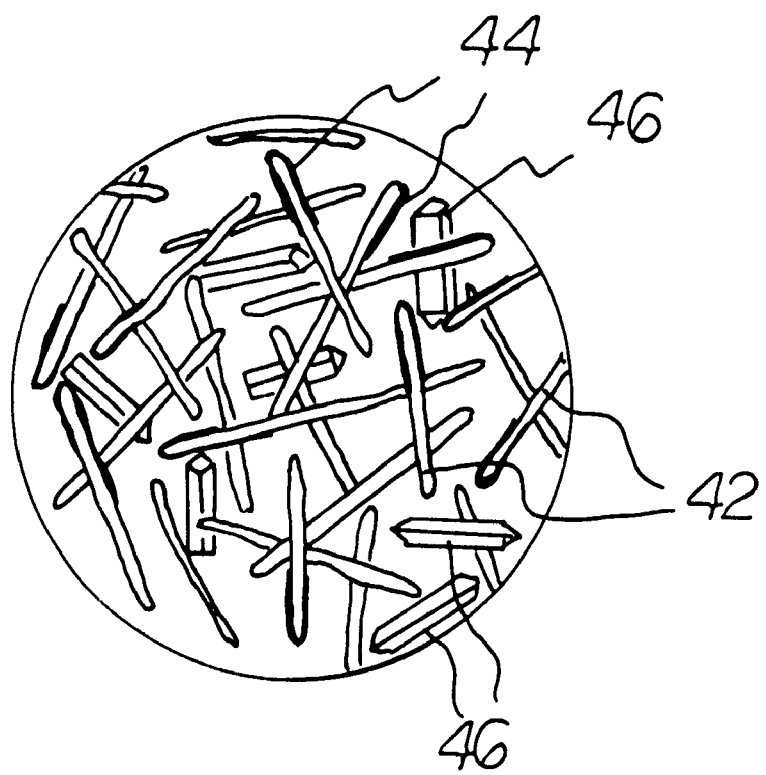
FIG. 5 is an enlarged showing of the paper with its component strands and the dye color coating as well as the crystals located there within.

As shown in FIG. 5, an enlarged illustration of the paper with its component strands 42 with a coating 44 of a vegetable dye there over for a particular color for a correlated particular flavor crystal. The flavor crystals 46 are larger in size than the composite strands making up the paper. In this manner, as hot water is poured through the filter and crystals, the crystals will dissolve providing flavoring to the coffee being brewed. As the crystals are dissolved, there will be an increase of water through the paper due to the increase of openings between the strands comprising the paper. Increasing or decreasing the quantity of crystals per a specific area of the paper will increase or decrease the extent of the added flavor.

An additional feature of the flavored filters would be that they are color coordinated with the flavor offered, as for example, a brown colored dye indicates chocolate flavored crystals, a beige colored dye indicates vanilla flavored crystals, or a red colored dye indicates a cinnamon flavored crystals.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A filter system for blending flavoring and coffee flavor during the brewing of coffee comprising, in combination:

a filter element having an upper portion with downwardly tapering side walls and vertical undulations having an open top for the receipt of coffee to be brewed and water to be poured there over for brewing purposes;

a closed lower portion coupled at its periphery to the lower extent of the upper portion adapted to support ground coffee thereon for being brewed and to allow the passage of water from above the coffee to beneath and through the lower portion; and the filter being fabricated of paper in a one-piece configuration with flavor crystals dispersed throughout the entire paper of the filter for disseminating a flavor other than coffee to the coffee being brewed, the paper of the filter also including a dye to color the paper coordinated to the flavor of the particles within the filter.

2. The filter as set forth in claim 1 wherein the lower portion is flat.

3. The filter as set forth in claim 1 wherein the lower portion is linear.

4. The filter as set forth in claim 1 wherein the filter is cone shaped.

5. The filter system as set forth in claim 1 wherein the colored dye is brown and the crystals are chocolate flavored.

6. The filter system as set forth in claim 1 wherein the colored dye is beige and the crystals are vanilla flavored.

7. The filter system as set forth in claim 1 wherein the colored dye is red and the crystals are cinnamon flavored.

* * * * *